(12) United States Patent
Tochio et al.

(10) Patent No.: US 6,968,102 B2
(45) Date of Patent: Nov. 22, 2005

(54) NODE DEVICE OF OPTICAL RING NETWORK

(75) Inventors: Yuji Tochio, Kawasaki (JP); Satoshi Kuroyanagi, Inagi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/085,164

(22) Filed: Mar. 22, 2005

(65) Prior Publication Data

US 2005/0175277 A1 Aug. 11, 2005

Related U.S. Application Data

(63) Continuation of application No. PCT/JP03/02517, filed on Mar. 4, 2003.

(51) Int. Cl.[7] .............................................. G02B 6/28
(52) U.S. Cl. .............................. 385/24; 385/16; 398/3; 398/7; 398/45; 398/59; 398/83; 370/223
(58) Field of Search ................................ 398/3–5, 7, 45, 398/59, 82, 83; 370/222, 223; 385/15, 16, 385/24

(56) References Cited

U.S. PATENT DOCUMENTS

| | | | | |
|---|---|---|---|---|
| 6,130,764 A | * | 10/2000 | Taniguchi | 398/1 |
| 6,249,510 B1 | * | 6/2001 | Thompson | 370/223 |
| 6,351,323 B1 | | 2/2002 | Onaka et al. | 398/84 |
| 6,473,397 B1 | * | 10/2002 | Au | 370/223 |
| 6,735,391 B2 | * | 5/2004 | Lee et al. | 398/3 |
| 6,842,562 B2 | * | 1/2005 | Kinoshita et al. | 385/24 |
| 6,885,822 B1 | * | 4/2005 | Chin et al. | 398/59 |
| 2004/0208574 A1 | * | 10/2004 | Kinoshita et al. | 398/83 |

FOREIGN PATENT DOCUMENTS

| | | | |
|---|---|---|---|
| EP | 1021011 | 7/2000 | H04J 14/02 |
| JP | 2-199431 | 8/1990 | G02F 1/313 |
| JP | 8-307361 | 11/1996 | H04B 10/20 |
| JP | 11-289296 | 10/1999 | H04B 10/02 |
| JP | 2000-209152 | 7/2000 | H04B 10/02 |
| JP | 2000-316018 | 11/2000 | H04L 12/437 |
| JP | 2002-368721 | 12/2002 | H04J 14/00 |

* cited by examiner

Primary Examiner—John D. Lee
Assistant Examiner—Daniel Petkovsek
(74) Attorney, Agent, or Firm—Staas & Halsey LLP

(57) ABSTRACT

A node device of an optical ring network is disclosed. With the node device, a counterclockwise auxiliary wavelength supplied from a third switch part is returned and supplied to a clockwise add/drop part when there is a fault in an optical transmission path on a left side, a clockwise auxiliary wavelength supplied from a second switch part is returned and supplied to a counterclockwise add/drop part when there is a fault in an optical transmission path on a right side, a clockwise active wavelength supplied from a clockwise add/drop part is returned and supplied to a first switch part when there is a fault in the optical transmission path on the right side, and a counterclockwise active wavelength supplied from the counterclockwise add/drop part is returned and supplied to a fourth switch part when there is a fault in the optical transmission path on the left side.

10 Claims, 18 Drawing Sheets

NODE DEVICE OF OPTICAL RING NETWORK

CROSS-REFERENCE TO RELATED APPLICATIONS

This application is a U.S. continuation application filed under 35 USC 111(a) claiming benefit under 35 USC 120 and 365(c) of PCT application JP 2003/002517, filed Mar. 4, 2003. The foregoing application is hereby incorporated herein by reference.

BACKGROUND OF THE INVENTION

1. Field of the Invention

The present invention relates to a node apparatus of an optical ring network.

2. Description of the Related Art

In recent years and continuing, the demand for optical networks is increasing along with the growth of Internet traffic. Among the optical networks, an optical network which is able to handle vast amounts of data at high speed in the form of optical signals is drawing attention. Accordingly, there is a demand for a node configuration that efficiently accommodates and provides channels for such optical networks.

FIG. 1 is a drawing showing an exemplary configuration of a conventional optical ring network. This configuration includes nodes 0-1 through 0-8 that are connected in a ring-like manner. Taking redundancy into consideration, the nodes 0-1 through 0-8 are connected by employing two optical transmission lines of an active system and an auxiliary system (See, for example, Japanese Laid-Open Patent Application Nos. 2-199431 and 11-289296).

With reference to FIG. 2, in a case where the optical transmission line connecting node 0-1 and node 0-8 cannot be used due to a fault, such as disconnection, the fault is recovered from by executing the so-called line protection in which a network which is equivalent to the network prior to the fault is generated by returning (turning back) at the faulty end nodes (in this case node 0-1 and node 0-8). In this case, since the faulty end nodes that are to be controlled are only nodes 0-1 and 0-8, a redundant system can be achieved by simple control.

However, with the foregoing scheme, the number of transit nodes and the transmission distance increases upon recovering from the fault. This leads to a problem of transmission loss of optical signals. Particularly, the loss is more significant at an optical add/drop device that executes add/drop of a particular wavelength inside a transit node rather than at a transmission line; thereby resulting in large degradation of a transmission property during fault recovery.

SUMMARY OF THE INVENTION

Accordingly, it is an object of the present invention to provide a node device of an optical ring network for reducing transmission loss that increases during a fault in the optical transmission path and for alleviating degradation of the transmission property during fault recovery.

In order to achieve the object, the present invention provides a node device for a bi-directional optical ring network including includes a clockwise demultiplexing part for demultiplexing an input multiplexed wavelength signal into a clockwise active wavelength signal and a clockwise auxiliary wavelength signal, a counter clockwise demultiplexing part for demultiplexing another input multiplexed wavelength signal into a counter clockwise active wavelength signal and a counter clockwise auxiliary wavelength signal, a first switch part for transmitting the clockwise active wavelength signal and the counter clockwise auxiliary wavelength signal during a normal operation and returning the counter clockwise auxiliary signal when a fault occurs in an adjacent optical transmission path situated on a left side of the node device, a fourth switch part for transmitting the counter clockwise active wavelength signal and the clockwise auxiliary wavelength signal during the normal operation and returning the clockwise auxiliary signal when a fault occurs in an adjacent optical transmission path situated on a right side of the node device, a clockwise add/drop part for adding or dropping a predetermined wavelength signal in the clockwise active wavelength signal transmitted from the first switch part, a counter clockwise add/drop part for adding or dropping a predetermined wavelength signal in the counter clockwise active wavelength signal transmitted from the fourth switch part, a second switch part for transmitting the clockwise active wavelength signal output from the clockwise add/drop part and the counter clockwise auxiliary wavelength signal output from the counter clockwise demultiplexing part during the normal operation and returning the clockwise active wavelength signal output from the clockwise add/drop part when a fault occurs in the adjacent optical transmission path situated on the right side of the node device, a third switch part for transmitting the counter clockwise active wavelength signal output from the counter clockwise add/drop part and the clockwise auxiliary wavelength signal output from the clockwise demultiplexing part during the normal operation and returning the counter clockwise active wavelength signal output from the counter clockwise add/drop part when a fault occurs in the adjacent optical transmission path situated on the left side of the node device, a clockwise multiplexing part for multiplexing the clockwise active wavelength signal transmitted from the second switch part and the clockwise auxiliary wavelength signal transmitted from the fourth switch part, and a counter clockwise multiplexing part for multiplexing the counter clockwise active wavelength signal transmitted from the third switch part and the counter clockwise auxiliary wavelength signal transmitted from the first switch part.

DESCRIPTION OF THE PREFERRED EMBODIMENTS

Embodiments of the present invention are described below with reference to the drawings.

Figure 1:
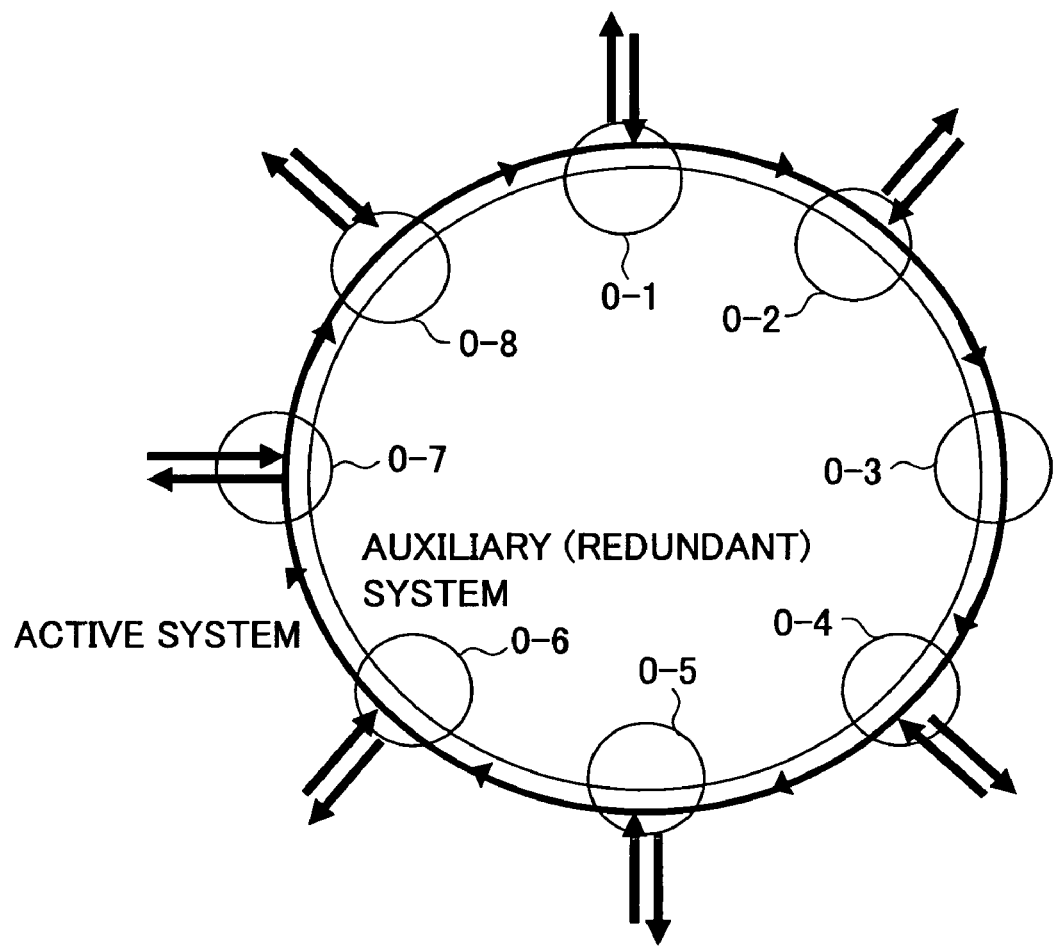
FIG. 1 is a drawing showing an exemplary configuration of a conventional optical ring network.
Figure 2:
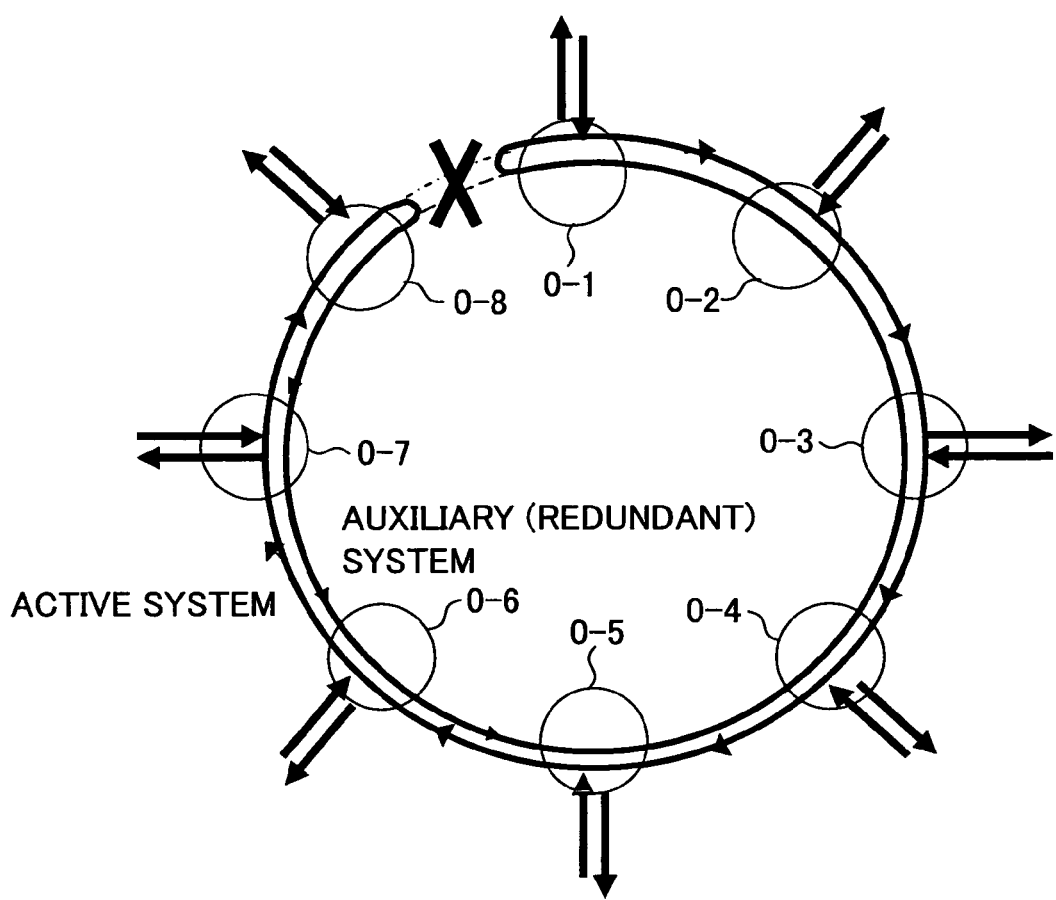
FIG. 2 is a drawing showing an exemplary configuration of a conventional optical ring network during fault recovery.
Figure 3:
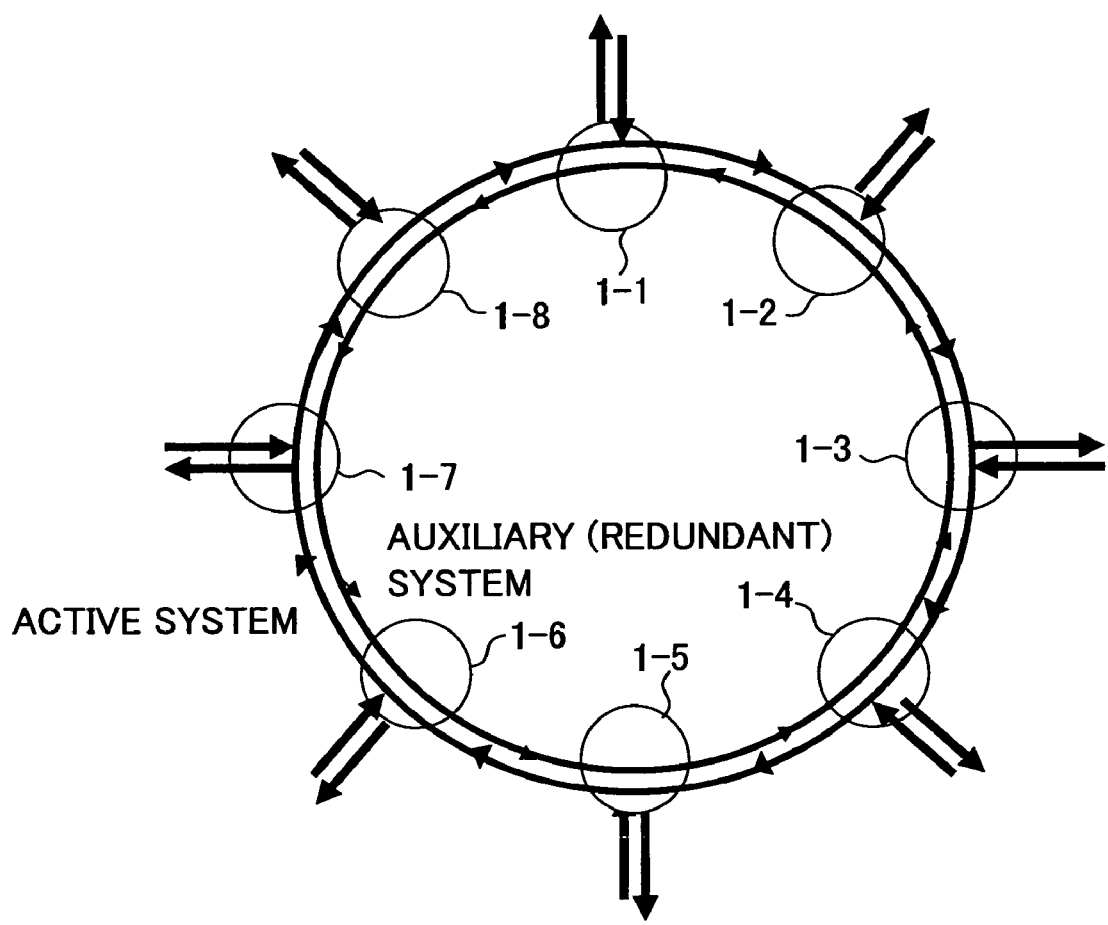
FIG. 3 is a drawing showing an exemplary configuration of an optical ring network according to an embodiment of the present invention.
Figure 4:
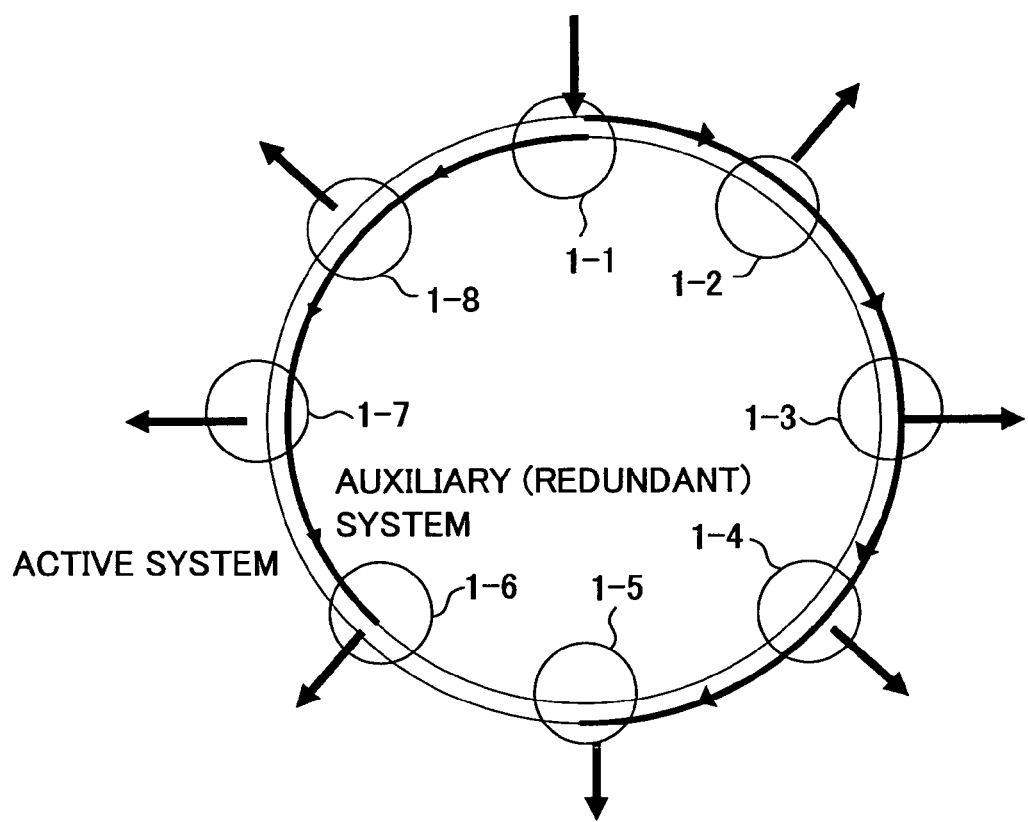
FIG. 4 is a drawing showing an exemplary configuration of an optical ring network according to an embodiment of the present invention during a normal operation.

FIG. 3 is a drawing showing a configuration of a two-directional ring network according an embodiment of the present invention. In FIG. 3, nodes 1—1 through 1-8 are connected by a clockwise optical transmission line and a counter clockwise optical transmission line in a ring-like manner. For example, in a normal operation, a path added from node 1—1 shortens its transmission route by preparing a clockwise transmission path to node 1-5 and a counter clockwise transmission path to node 1-6, as shown in FIG. 4.

Figure 5:
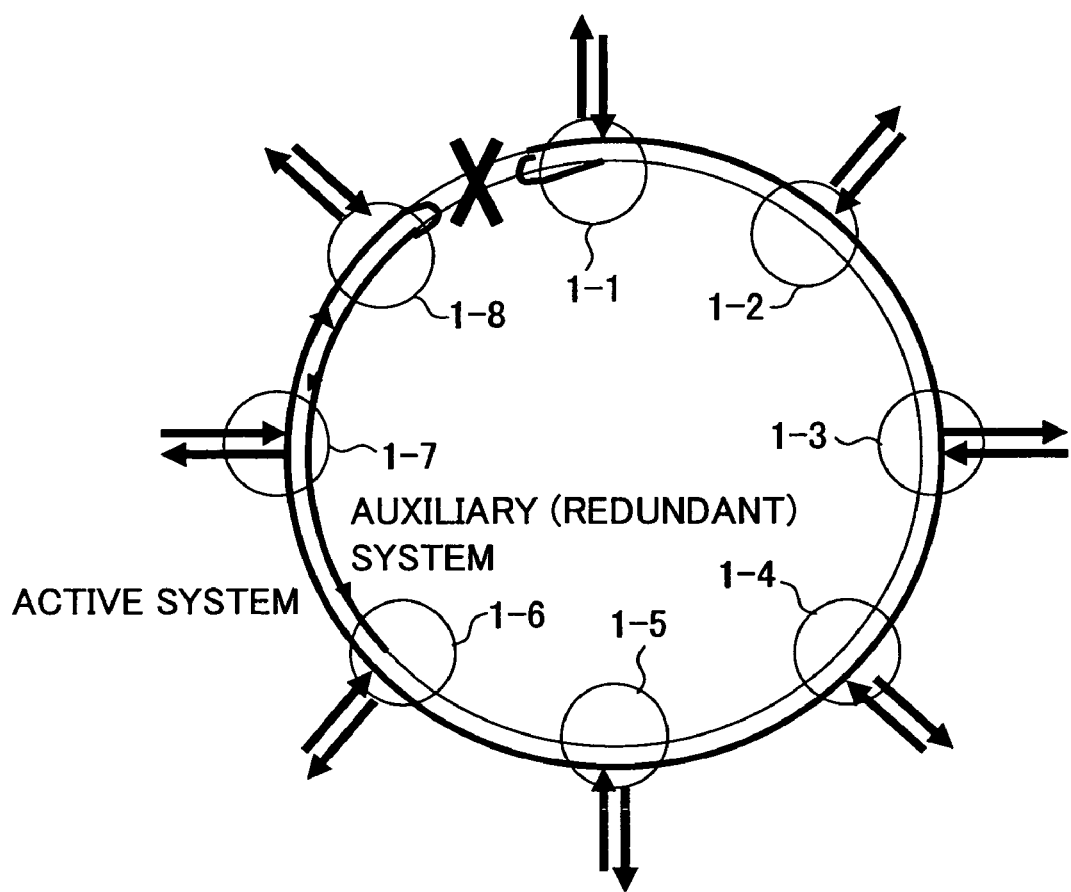
FIG. 5 is a drawing showing an exemplary configuration of an optical ring network according to an embodiment of the present invention during a fault recovery.

In a case where an optical transmission line between node 1—1 and node 1-8 cannot be used due to a fault such as disconnection, a counter clockwise optical transmission line between node 1—1 and node 1-8 is switched to a clockwise optical transmission line from node 1—1 to node 1-8, as shown in FIG. 5. In this case, an overlap of transmission route is created between node 1-2 and node 1-5. Therefore, during such fault, a redundant system can be obtained by using auxiliary wavelengths for the wavelengths to be provided to the nodes 1-6 through 1-8.

Figure 6:
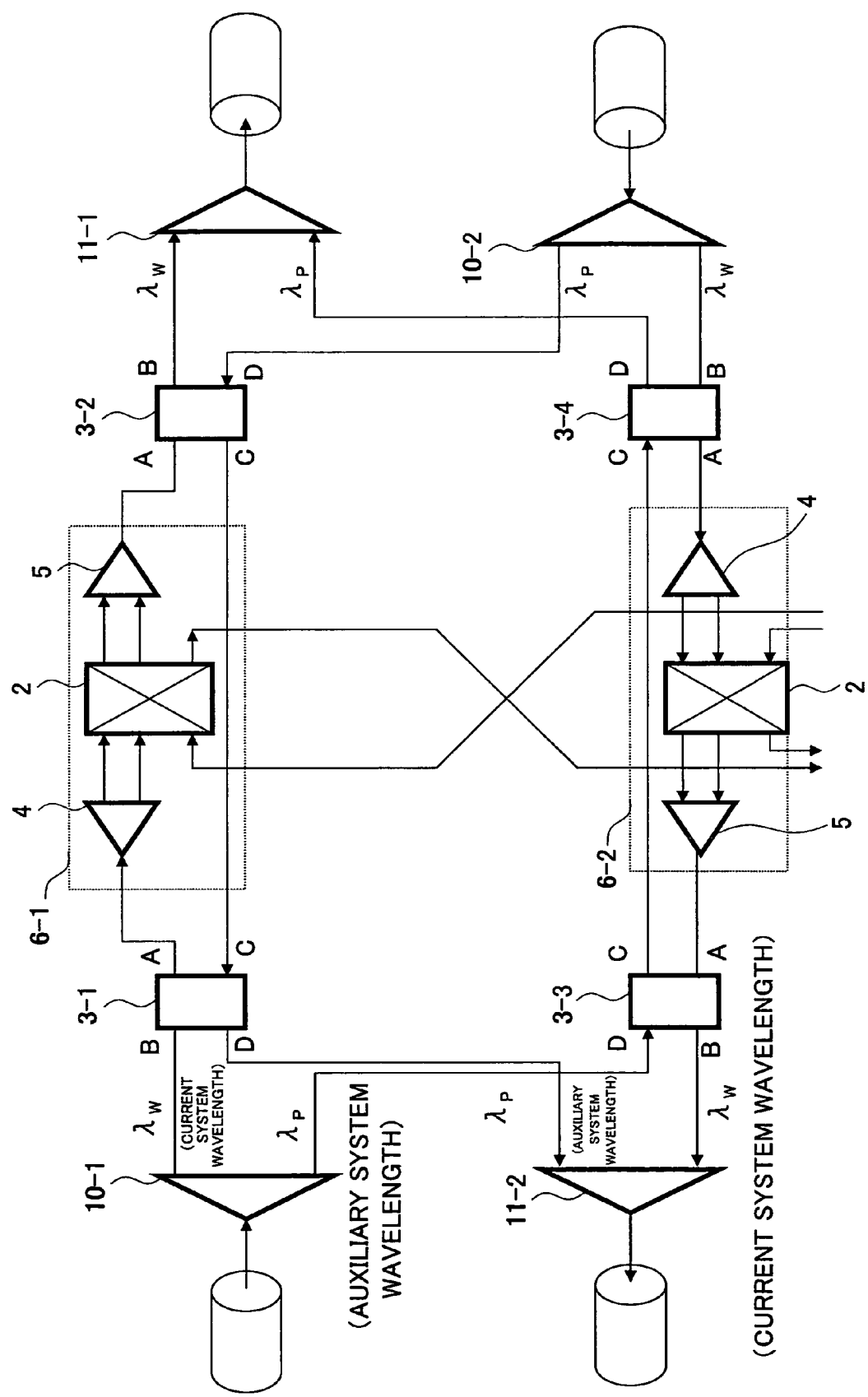
FIG. 6 is a drawing showing a node device according to a first embodiment of the present invention.

FIG. 6 is a drawing showing a configuration of a node device applied to nodes 1—1 through 1-8 according to the first embodiment of the present invention. In FIG. 6, the optical transmission line for the clockwise transmission path (clockwise optical transmission line) is connected to an optical demultiplexer 10-1. The optical demultiplexer 10-1 demultiplexes a multiplexed wavelength signal input from the clockwise optical transmission line into an active system wavelength $\lambda w$ ($\lambda_{N+1} \sim \lambda_{2N}$) and an auxiliary system wavelength $\lambda p$ ($\lambda_1 \sim \lambda_N$) and supplies the active system wavelength $\lambda w$ to port B of a 2×2 switch 3-1 and the auxiliary system wavelength $\lambda p$ to Port D of a 2×2 switch 3—3.

Figure 7:
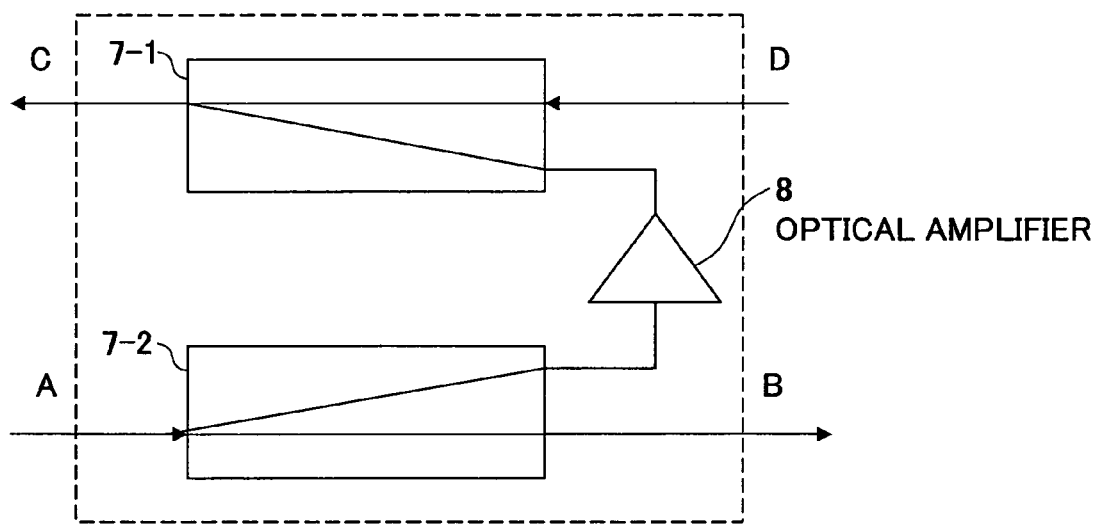
FIG. 7 is a drawing showing a configuration of a 2×2 switch according to an embodiment of the present invention.

The 2×2 switches 3-1 through 3-4 are optical matrix switches as shown in FIG. 7. In a normal operation, ports A and B are connected, and ports C and D are connected. In a fault recovery operation, input optical signals from port A are output from port C via 2×1 switches 7-2 and 7-1. Since the input optical signals pass through the two 2×1 switches 7-2, 7-1 in the fault recovery operation, the input optical signals are subject to switch loss and fiber transmission loss. Therefore, an optical amplifier 8 is provided between the 2×1 switch 7-1 and 2×1 switch 7-2.

Then, the optical signals output from port A of the 2×2 switch 3-1 are supplied to an optical demultiplexer 4 of an optical add/drop device 6-1.

In the add/drop device 6-1, the optical demultiplexer 4 demultiplexes input optical signals into respective wavelengths and supplies the wavelengths (signals) to a matrix optical switch 2. The matrix optical switch 2 extracts and drops an optical signal having a specific wavelength. The matrix optical switch 2 also guides and adds an optical signal having a specific wavelength into the network. The respective optical signals with the specific wavelengths which are output from the matrix optical switch 2 are multiplexed in an optical multiplexer 5. The multiplexed optical signal is input to port A of a 2×2 switch 3-2. In a case of normal operation, the multiplexed optical signal is output from port B of the 2×2 switch 3-1 to an optical multiplexer 11-1.

Meanwhile, in a normal operation, the auxiliary system wavelength $\lambda p$ input to port D of the 2×2 switch 3—3 is output from port C of the 2×2 switch 3—3, is then input to port C of a 2×2 switch 3-4, is then output from port D of the 2×2 switch 3-4, and is then supplied the optical multiplexer 11-1. The optical multiplexer 11-1 multiplexes the optical signals output from port B of the 2×2 switch 3-2 and the optical signals output from port D of the 2×2 switch 3-4 and transmits the multiplexed optical signal to the clockwise optical transmission line.

The optical transmission line for the counter clockwise transmission path (counter clockwise optical transmission line) is connected to an optical demultiplexer 10-2. The optical demultiplexer 10-2 demultiplexes a multiplexed wavelength signal input from the counter clockwise optical transmission line into an active system wavelength $\lambda w$ ($\lambda_1 \sim \lambda_N$) and an auxiliary system wavelength $\lambda p$ ($\lambda_{N+1} \sim \lambda_{2N}$) Here, the active system wavelength $\lambda w$ ($\lambda_1 \sim \lambda_N$) and the auxiliary system wavelength $\lambda p$ ($\lambda_{N+1} \sim \lambda_{2N}$) of the counter clockwise optical transmission line are oppositely set with respect to the active system wavelength $\lambda w$ ($\lambda_{N+1} \sim \lambda_{2N}$) and the auxiliary system wavelength $\lambda p$ ($\lambda_1 \sim \lambda_N$) of the clockwise optical transmission line.

The active system wavelength $\lambda w$ of the counter clockwise optical transmission line is supplied to port B of the 2×2 switch 3-4 and the auxiliary system wavelength $\lambda p$ of the counter clockwise optical transmission line is supplied to port D of the 2×2 switch 3-2. The active system wavelength $\lambda w$ is output from port A of the 2×2 switch 3-4 to an optical demultiplexer 4 of an optical add/drop device 6-2.

In the add/drop device 6-2, the optical demultiplexer 4 demultiplexes input optical signal into respective wavelengths and supplies the wavelengths to a matrix optical switch 2. The matrix optical switch 2 extracts and drops an optical signal having a specific wavelength. The matrix optical switch 2 also guides and adds an optical signal having a specific wavelength into the network. The respective optical signals with the specific wavelengths which are output from the matrix optical switch 2 are multiplexed in an optical multiplexer 5. The multiplexed optical signal is input to port A of a 2×2 switch 3—3. In a case of normal operation, the multiplexed optical signal is output from port B of the 2×2 switch 3—3 to an optical multiplexer 11-2.

Meanwhile, in a normal operation, the auxiliary system wavelength λp input to port D of the 2×2 switch 3-2 is output from port C of the 2×2 switch 3-2, is then input to port C of a 2×2 switch 3-1, is then output from port D of the 2×2 switch 3-1, and is then supplied the optical multiplexer 11-2. The optical multiplexer 11-2 multiplexes the optical signals output from port B of the 2×2 switch 3—3 and the optical signals output from port D of the 2×2 switch 3-1 and transmits the multiplexed optical signal to the counter clockwise optical transmission line.

Figure 8:
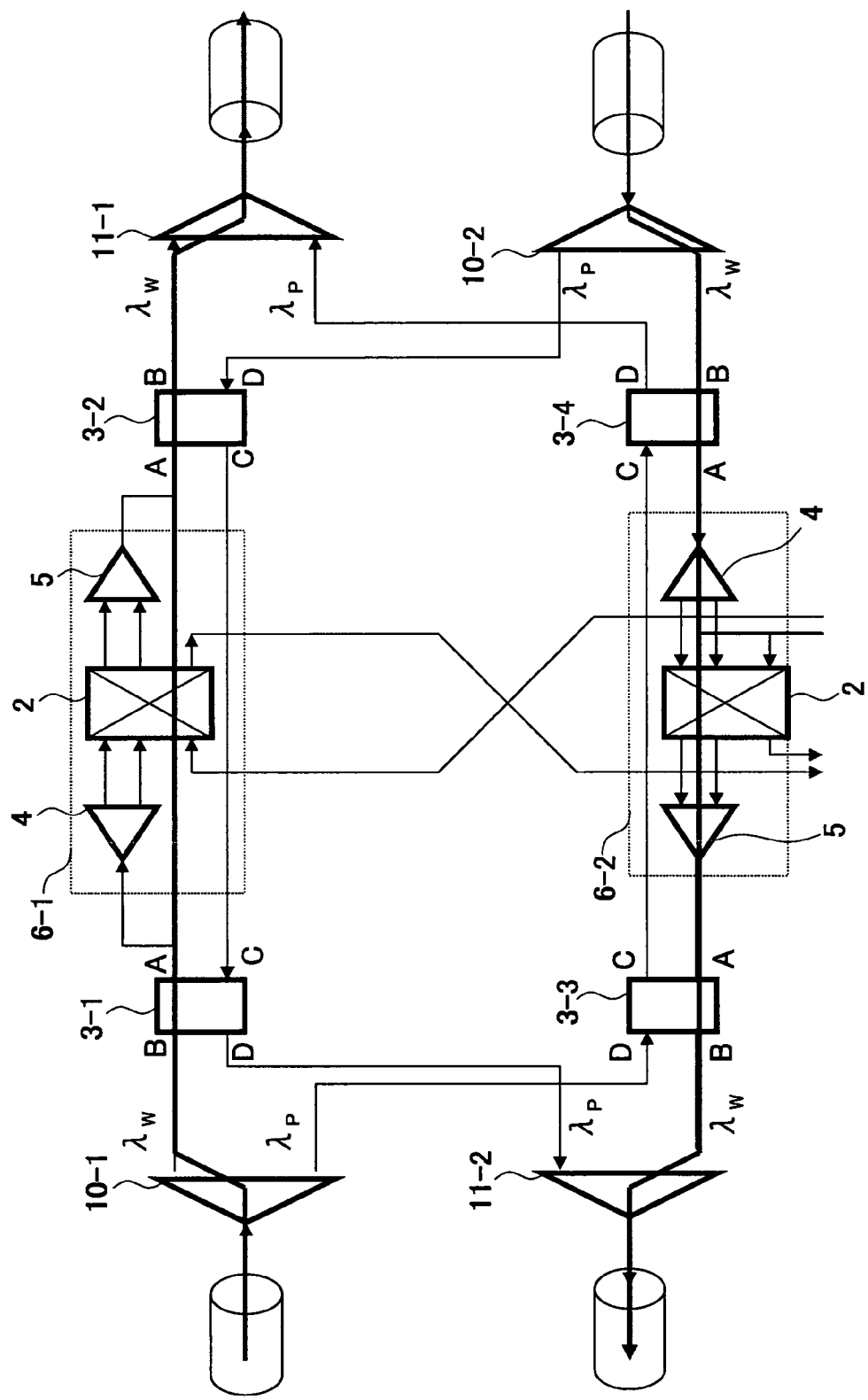
FIG. 8 is a drawing showing the flow of optical signals during a normal operation according to an embodiment of the present invention.

FIG. 8 is a drawing illustrated with bold arrows for indicating the flow of optical signals in a normal operation. As shown in FIG. 8, ports A and B are connected in each of the 2×2 switches 3-1 through 3-4 and both clockwise and counter clockwise optical signals pass through the matrix optical switch 2 of the optical add/drop devices 6-1 and 6-2. In this case, the wavelength applied to both clockwise and counter clockwise optical signals is the active system wavelength λw. The active system wavelength λw of the clockwise optical signal is $\lambda_{N+1} \sim \lambda_{2N}$ and the active system wavelength λw of the counter clockwise optical signal is $\lambda_1 \sim \lambda_N$.

Figure 9:
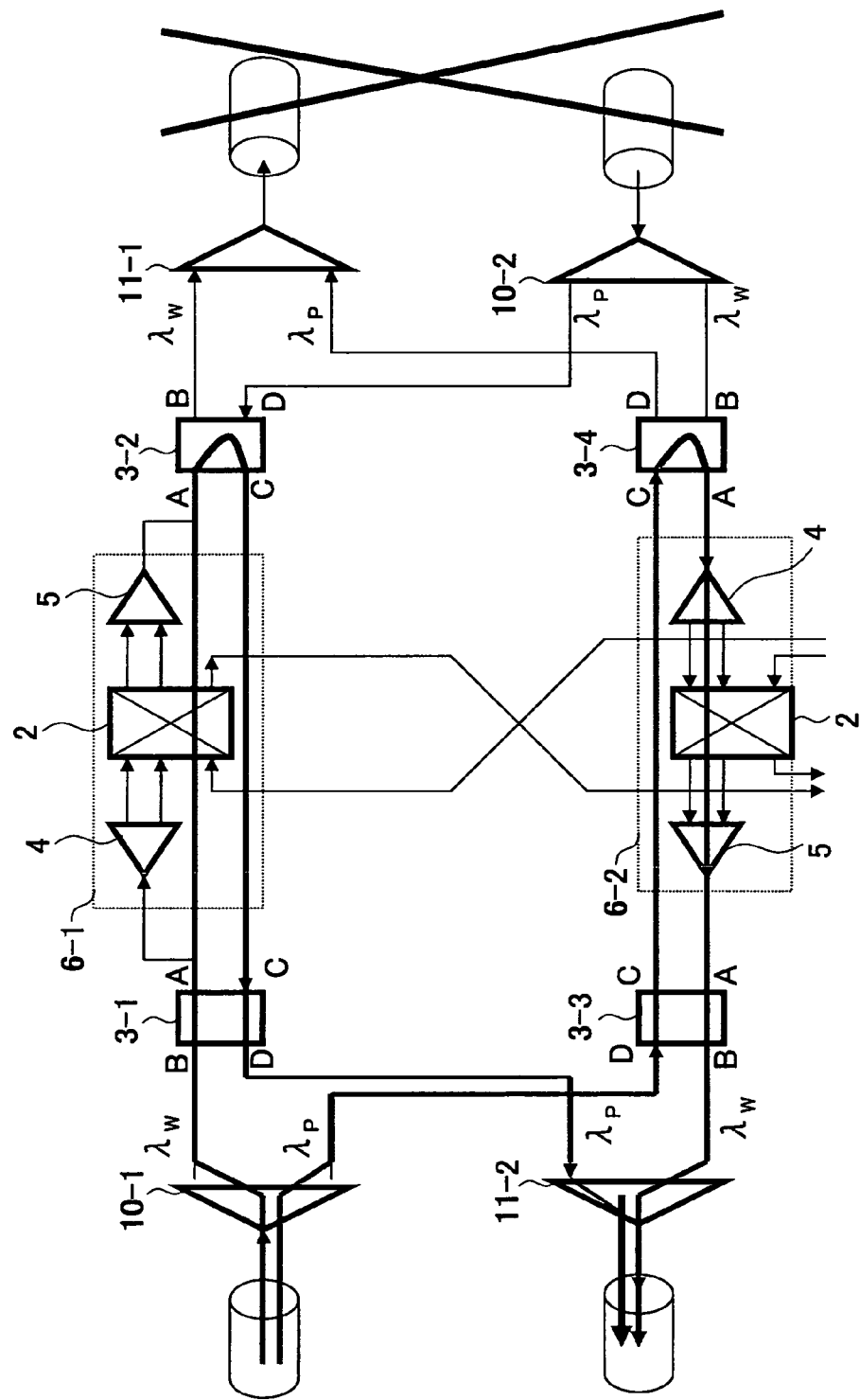
FIG. 9 is a drawing the flow of optical signals in a case where a fault occurs in an adjacent right side optical transmission line according to an embodiment of the present invention.

FIG. 9 is a drawing illustrated with bold arrows for indicating the flow of optical signals of a faulty end node device in a case where a fault occurs in an optical transmission line neighboring at the right side thereof. In this case, the optical signals are returned by switching the 2×2 switches 3-2 and 3-4 on the faulty side and connecting their ports A and C respectively. As a result, the optical signals with the clockwise active system wavelength λw input from the optical demultiplexer 10-1 are return at the 2×2 switch 3-2. The returned optical signals, without being passed through the matrix optical switch 2 of the optical add/drop apparatus 6-1, are supplied to the optical multiplexer 11-2 as optical signals with the counter clockwise auxiliary system wavelength λp via the 2×2 switch 3-1. Furthermore, the optical signals with the clockwise auxiliary system wavelength λp input from the optical demultiplexer 10-1 are returned at the 2×2 switch 3-4. The returned optical signals are supplied to the optical multiplexer 11-2 as optical signals with the counter clockwise active system wavelength λw via the 2×2 switch 3—3 and are transmitted to the counter clockwise optical transmission line.

Figure 10:
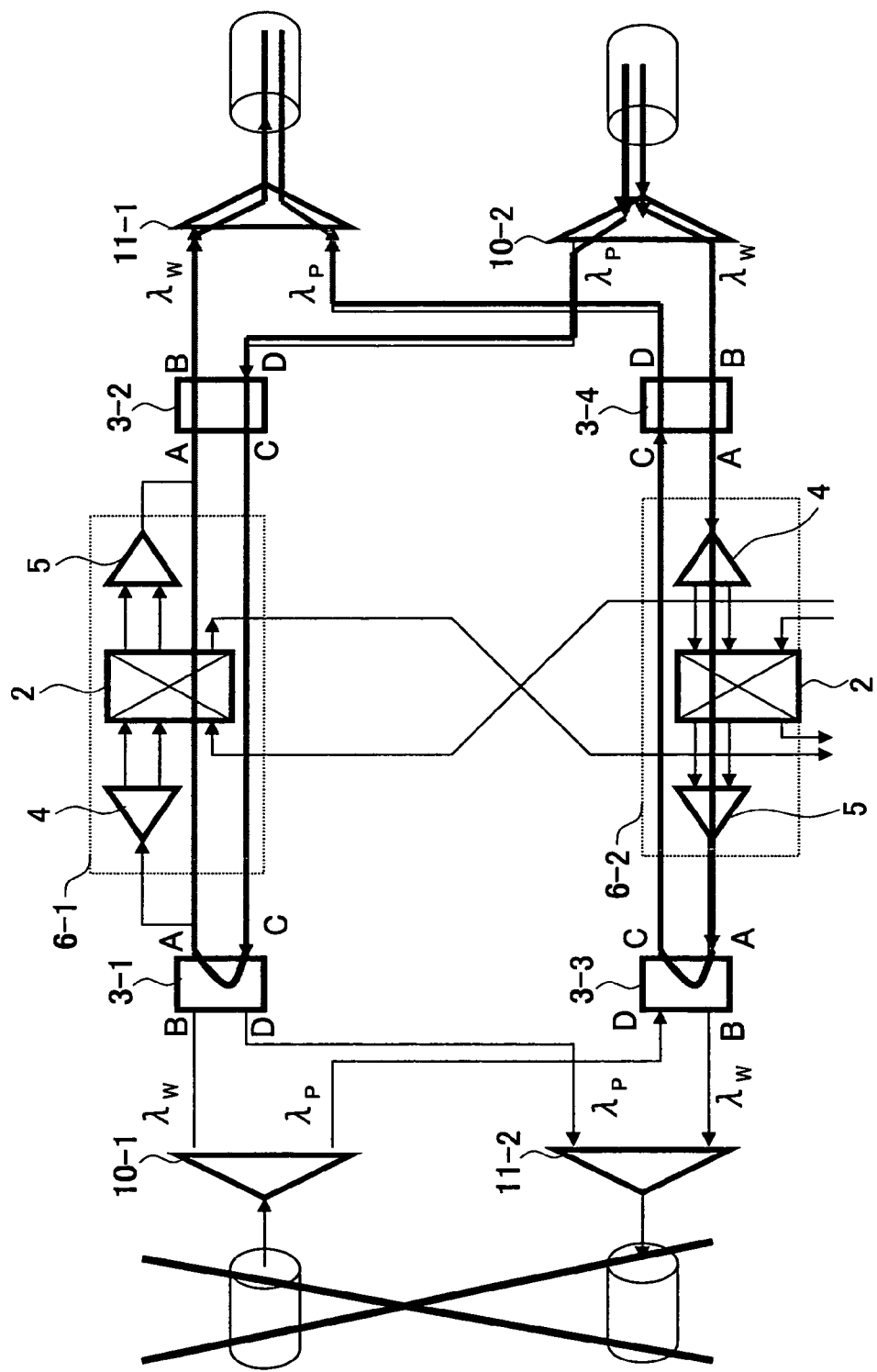
FIG. 10 is a drawing the flow of optical signals in a case where a fault occurs in an adjacent left side optical transmission line according to an embodiment of the present invention.

FIG. 10 is a drawing illustrated with bold arrows for indicating the flow of optical signals of a faulty end node device in a case where a fault occurs in an optical transmission line neighboring at the left side thereof. In this case, the optical signals are returned by switching the 2×2 switches 3-1 and 3—3 on the faulty side and connecting their ports A and C respectively. As a result, the optical signals with the counter clockwise active system wavelength λw input from the optical demultiplexer 10-2 are returned at the 2×2 switch 3—3. The returned optical signals, without being passed through the matrix optical switch 2 of the optical add/drop apparatus 6-2, are supplied to the optical multiplexer 11-1 as optical signals with the clockwise auxiliary system wavelength λp via the 2×2 switch 3-4. Furthermore, the optical signals with the counter clockwise auxiliary system wavelength λp input from the optical demultiplexer 10-2 are returned at the 2×2 switch 3-1. The returned optical signals are supplied to the optical multiplexer 11-1 as optical signals with the clockwise active system wavelength λw via the 2×2 switch 3-2 and are transmitted to the clockwise optical transmission line.

Figure 11:
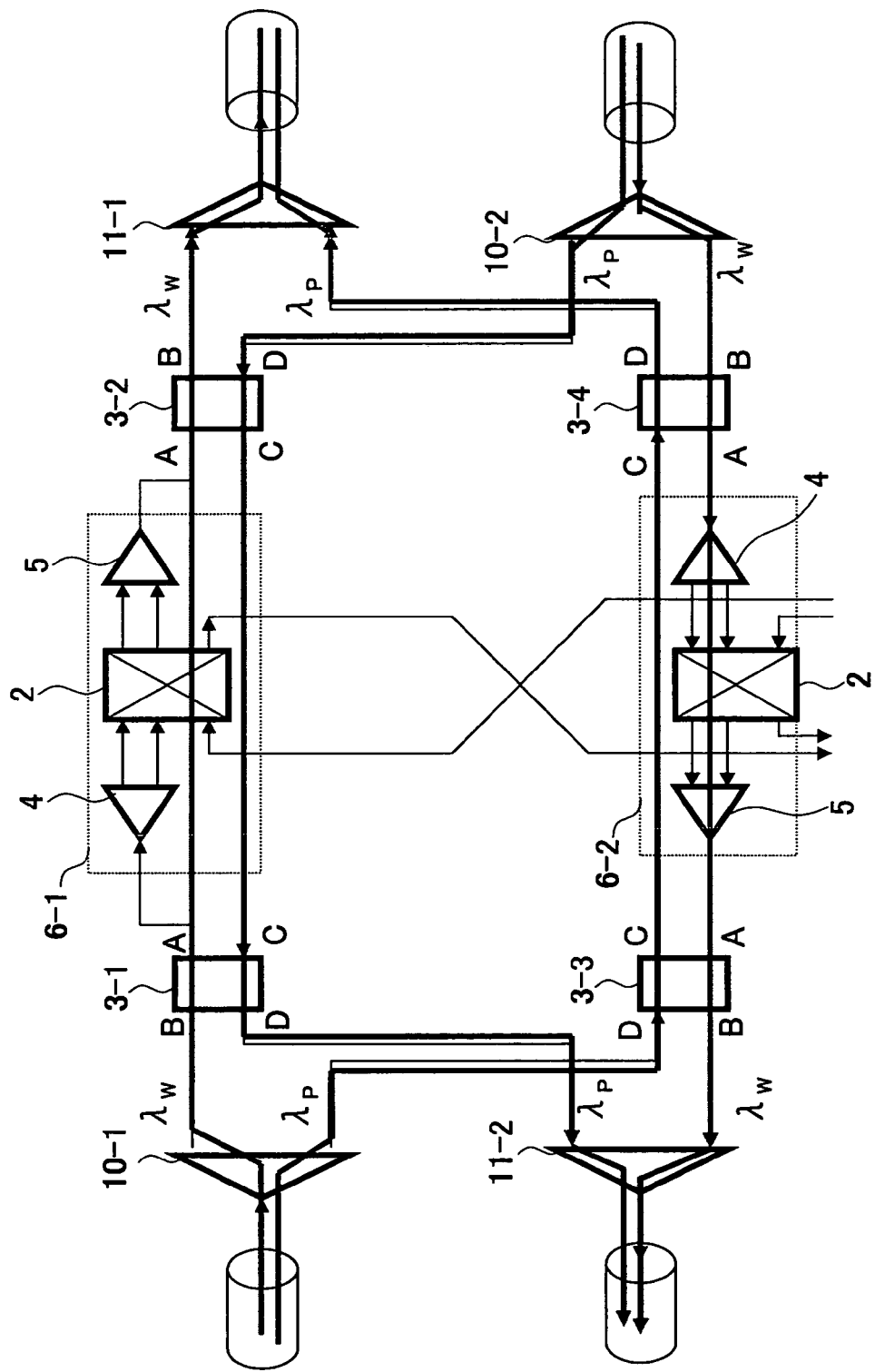
FIG. 11 is a drawing showing the flow of optical signals in a node device other than a faulty end node device in a case of a fault.

FIG. 11 is a drawing illustrated with bold arrows for indicating the flow of optical signals of a node device other than the faulty end node device in a case where a fault occurs. The optical signals, being returned from the faulty end node device and supplied as reverse optical signals of the auxiliary system wavelength λp, are transmitted without being passed through the matrix optical switch 2 of the optical add/drop apparatuses 6-1 and 6-2. Accordingly, since the optical signals are not passed through the matrix optical switch 2 of the optical add/drop apparatuses 6-1 and 6-2, the optical transmission loss can be alleviated and loss of transmission property can be reduced.

Figure 12:
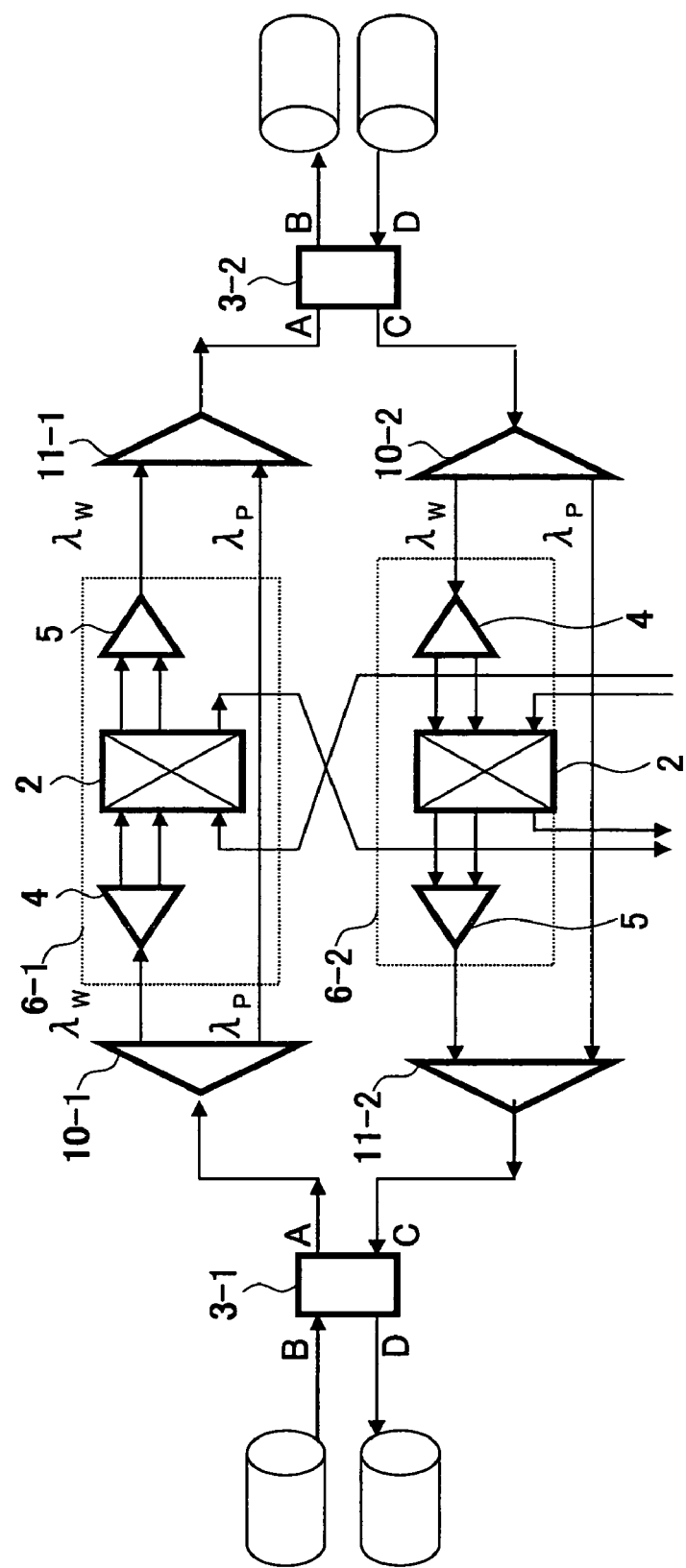
FIG. 12 is a drawing showing a node device according to a second embodiment of the present invention.

FIG. 12 is a drawing showing a configuration of a node device applied for nodes 1—1 through 1-8 according to a second embodiment of the present invention. In the configuration of the node device according to the second embodiment of the present invention, 2×2 switches are situated at outer sides of optical multiplexers and optical demultiplexers. With this configuration, the number of 2×2 switches can be reduced to two. In the second embodiment of the present invention, like components are denoted with like numerals as of the first embodiment of the present invention.

In FIG. 12, the clockwise optical transmission line is connected to port B of the 2×2 switch 3-1 and port A of the 2×2 switch 3-1 is connected to the optical demultiplexer 10-1. The optical demultiplexer 10-1 demultiplexes a multiplexed wavelength signal input from the clockwise optical transmission line into an active system wavelength λw ($\lambda_{N+1} \sim \lambda_{2N}$) and an auxiliary system wavelength λp ($\lambda_1 \sim \lambda_N$) and supplies the active system wavelength λw to the optical add/drop device 6-1 and the auxiliary system wavelength λp to the optical multiplexer 11-1.

The 2×2 switches 3-1 and 3-2 are optical matrix switches as shown in FIG. 7. In a normal operation, ports A and B are connected, and ports C and D are connected.

In the add/drop device 6-1, the optical demultiplexer 4 demultiplexes an input optical signal into respective wavelengths and supplies the wavelengths to a matrix optical switch 2. The matrix optical switch 2 extracts and drops an optical signal having a specific wavelength. The matrix optical switch 2 also guides and adds an optical signal having a specific wavelength into the network. The respective optical signals with the specific wavelengths which are output from the matrix optical switch 2 are multiplexed in an optical multiplexer 5. The multiplexed optical signal is supplied to an optical multiplexer 11-1. The optical multiplexer 11-1 multiplexes the optical signals of the active system wavelength λw output from the optical add/drop device 6-1 and the optical signals of the auxiliary system wavelength λp output from the optical demultiplexer 10-1 and transmits the multiplexed optical signal to the clockwise optical transmission line through port A of the 2×2 switch 3-2 to port B of the 2×2 switch 3-2.

The counter clockwise optical transmission line is connected to port D of the 2×2 switch 3-2 and port C of the 2×2 switch 3-2 is connected to the optical demultiplexer 10-2. The optical demultiplexer 10-2 demultiplexes a multiplexed wavelength signal input from the counter clockwise optical transmission line into an active system wavelength λw ($\lambda_1 \sim \lambda_N$) and an auxiliary system wavelength λp ($\lambda_{N+1} \sim \lambda_{2N}$), and supplies the active system wavelength λw to the optical add/drop apparatus 6-2 and the auxiliary system wavelength λp to the optical multiplexer 11-2.

In the add/drop device 6-2, the optical demultiplexer 4 demultiplexes an input optical signal into respective wavelengths and supplies the wavelengths to a matrix optical switch 2. The matrix optical switch 2 extracts and drops an optical signal having a specific wavelength. The matrix optical switch 2 also guides and adds an optical signal having a specific wavelength into the network. The respective optical signals with the specific wavelengths which are output from the matrix optical switch 2 are multiplexed in an optical multiplexer 5. The multiplexed optical signal is supplied to the optical multiplexer 11-2. The optical multiplexer 11-2 multiplexes the optical signals of the active system wavelength λw output from the optical add/drop device 6-2 and the optical signals of the auxiliary system wavelength λp output from the optical demultiplexer 10-2 and transmits the multiplexed optical signal to the counter clockwise optical transmission line through port C of the 2×2 switch 3-1 to port D of the 2×2 switch 3-1.

In a case where a fault occurs in a neighboring optical transmission line, the node device according to the second embodiment of the present invention, in the same manner as the first embodiment of the present invention, returns optical signals by switching the 2×2 switches 3-1 and 3-2 on the faulty side and connecting their ports A and C, respectively. Furthermore, the node device other than the faulty node device operates in a same manner as in a normal operation without switching the 2×2 switches 3-1 and 3-2.

As a result, the optical signals, being returned from the faulty end node device, are transmitted in node devices other than the faulty end node device without being passed through the matrix optical switch 2 of the optical add/drop apparatuses 6-1 and 6-2 (i.e. transmitted without attenuation). Accordingly, since the optical signals are not passed through the matrix optical switches 2 of the optical add/drop apparatuses 6-1 and 6-2, the optical transmission loss can be alleviated.

Figure 13:
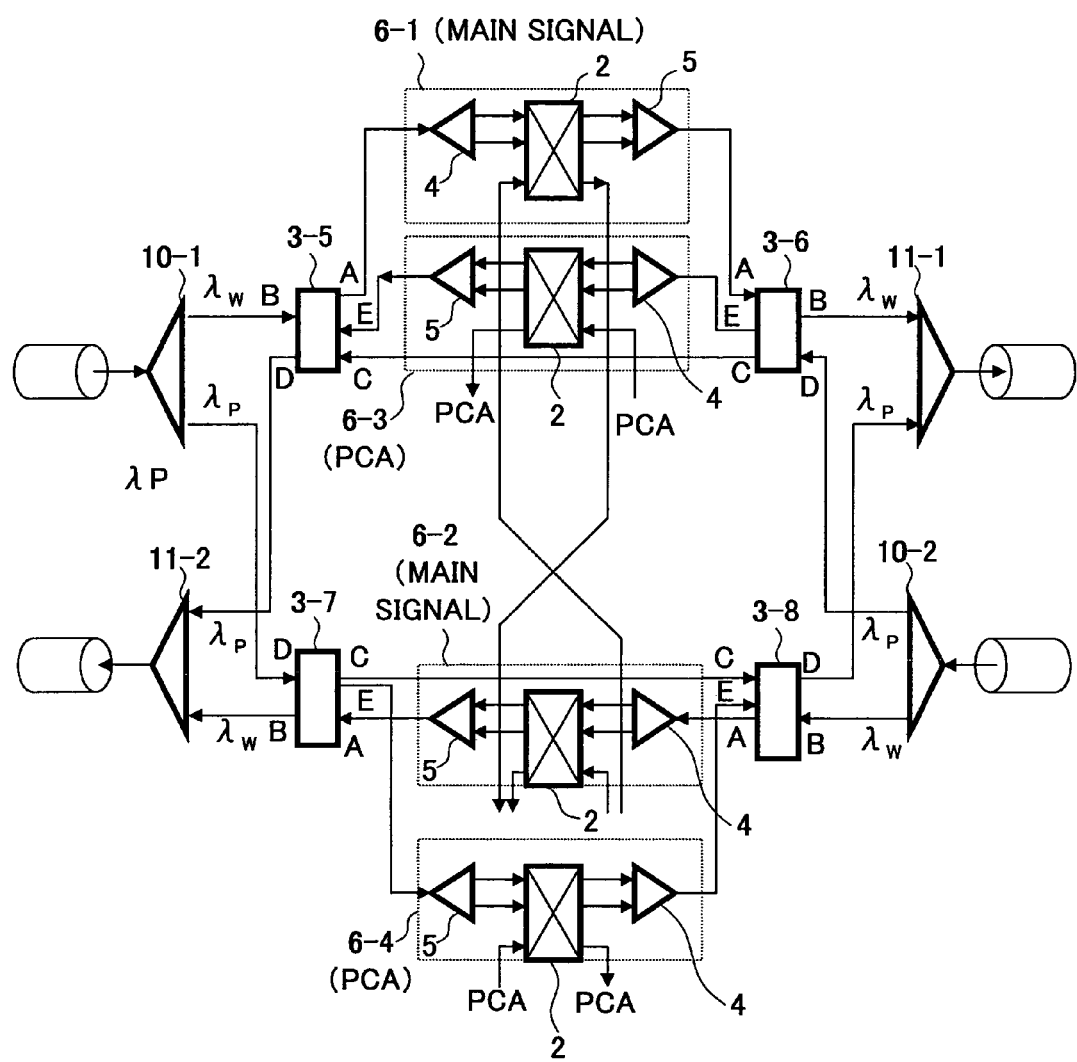
FIG. 13 is a drawing showing a node device according to a third embodiment of the present invention.

FIG. 13 is a drawing showing a configuration of a node device applied for nodes 1—1 through 1-8 according to a third embodiment of the present invention. In the configuration of the node device according to the third embodiment of the present invention, although the auxiliary optical transmission line does not operate during normal operation, low priority optical signals (PCA), which are employed as optical signals for executing predetermined functions (e.g. monitoring) are transmitted. In the third embodiment of the present invention, like components are denoted with like numerals as of the first and or the second embodiment of the present invention.

In FIG. 13, the clockwise optical transmission line is connected to the optical demultiplexer 10-1. The demultiplexer 10-1 demultiplexes the multiplexed wavelength signal input from the clockwise optical transmission line into an active system wavelength λw ($\lambda_{N+1} \sim \lambda_{2N}$) and an auxiliary system wavelength λp ($\lambda_1 \sim \lambda_N$), and supplies the active system wavelength λw to port B of a 2×3 switch 3-5 and auxiliary system wavelength λp to port D of a 2×3 switch 3-7.

The 2×3 switches 3-5 through 3-8 are optical matrix switches. In a normal operation, ports A and B are connected, and ports D and E are connected. In a fault recovery operation, ports are switched so that ports A and C can be connected.

The optical signal output from port A of the 2×3 switch 3-5 is supplied to the optical demultiplexer 4 of the optical add/drop device 6-1.

In the add/drop device 6-1, the optical demultiplexer 4 demultiplexes an input optcal signal into respective wavelengths and supplies the wavelengths to a matrix optical switch 2. The matrix optical switch 2 extracts and drops an optical signal having a specific wavelength. The matrix optical switch 2 also guides and adds an optical signal having a specific wavelength into the network. The respective optical signals with the specific wavelengths which are output from the matrix optical switch 2 are multiplexed in an optical multiplexer 5. The multiplexed optical signal is input to port A of a 2×3 switch 3-6. In a case of normal operation, the multiplexed optical signal is output from port B of the 2×3 switch 3-6 to an optical multiplexer 11-1.

Meanwhile, in a normal operation, the auxiliary system wavelength λp input to port D of the 2×3 switch 3-7 is output from port C of the 2×3 switch 3-7, and is then input to port C of a 2×3 switch 3-8. Furthermore, in an add/drop device 6-4, the optical demultiplexer 4 demultiplexes an input optical signal into respective wavelengths and supplies the wavelengths to a matrix optical switch 2. The matrix optical switch 2 extracts and drops the PCA signals. The matrix optical switch 2 also guides and adds the PCA signals into the network. The respective optical signals with the specific wavelengths which are output from the matrix optical switch 2 are multiplexed in an optical multiplexer 5. The multiplexed optical signal is input to port D of a 2×3 switch 3-8.

Since ports D and E of the 2×3 switch 3-8 are connected in the normal operation, the PCA signals added in the optical add/drop device 6-4 are supplied to the optical multiplexer 11-1 from port D of the 2×3 switch 3-8. The optical multiplexer 11-1 multiplexes the optical signals output from port B of the 2×3 switch 3-6 and the PCA signals from port D of the 2×3 switch 3-8, and transmits the multiplexed signal to the clockwise optical transmission line.

In a fault recovery operation, the 2×3 switches 3-6, 3-8 are switched for connecting port A and port C and returning optical signals.

The counter clockwise optical transmission line is connected to an optical demultiplexer 10-2. The optical demultiplexer 10-2 demultiplexes a multiplexed wavelength signal input from the counter clockwise optical transmission line into an active system wavelength λw ($\lambda_1 \sim \lambda_N$) and an auxiliary system wavelength λp ($\lambda_{N+1} \sim \lambda_{2N}$). The active system wavelength λw of the counter clockwise optical transmission line is supplied to port B of the 2×3 switch 3-8 and the auxiliary system wavelength λp of the counter clockwise optical transmission line is supplied to port D of the 2×3 switch 3-6.

The optical signals output from port A of the 2×3 switch 3-8 are input to the optical demultiplexer 4 of the optical add/drop device 6-2.

In the add/drop device 6-2, the optical demultiplexer 4 demultiplexes an input optical signal into respective wavelengths and supplies the wavelengths to a matrix optical switch 2. The matrix optical switch 2 extracts and drops an optical signal having a specific wavelength. The matrix optical switch 2 also guides and adds an optical signal having a specific wavelength into the network. The respective optical signals with the specific wavelengths which are output from the matrix optical switch 2 are multiplexed in an optical multiplexer 5. The multiplexed optical signal is input to port A of a 2×3 switch 3-7. In a case of normal operation, the multiplexed optical signal is output from port B of the 2×3 switch 3-7 to an optical multiplexer 11-2.

Meanwhile, in a normal operation, the auxiliary system wavelength λp input to port D of the 2×3 switch 3-6 is output from port C of the 2×3 switch 3-6 and is then input to port C of a 2×3 switch 3-5. Furthermore, in the add/drop device 6-3, the optical demultiplexer 4 demultiplexes an input optical signal into respective wavelengths and supplies the wavelengths to a matrix optical switch 2. The matrix optical switch 2 extracts and drops the PCA signals. The matrix optical switch 2 also guides and adds the PCA signals into the network. The respective optical signals with the specific wavelengths which are output from the matrix optical switch 2 are multiplexed in an optical multiplexer 5. The multiplexed optical signal is input to port E of a 2×3 switch 3-5.

Since ports D and E of the 2×3 switch 3-5 are connected in the normal operation, the PCA signals added in the optical add/drop device 6-3 are supplied to the optical multiplexer 11-2 from port D of the 2×3 switch 3-5. The optical multiplexer 11-2 multiplexes the optical signals output from port B of the 2×3 switch 3-7 and the PCA signals from port D of the 2×3 switch 3-5, and transmits the multiplexed signal to the counter clockwise optical transmission line.

In a fault recovery operation, the 2×3 switches 3-5, 3-7 are switched for connecting port A and port C and returning optical signals.

Figure 14:
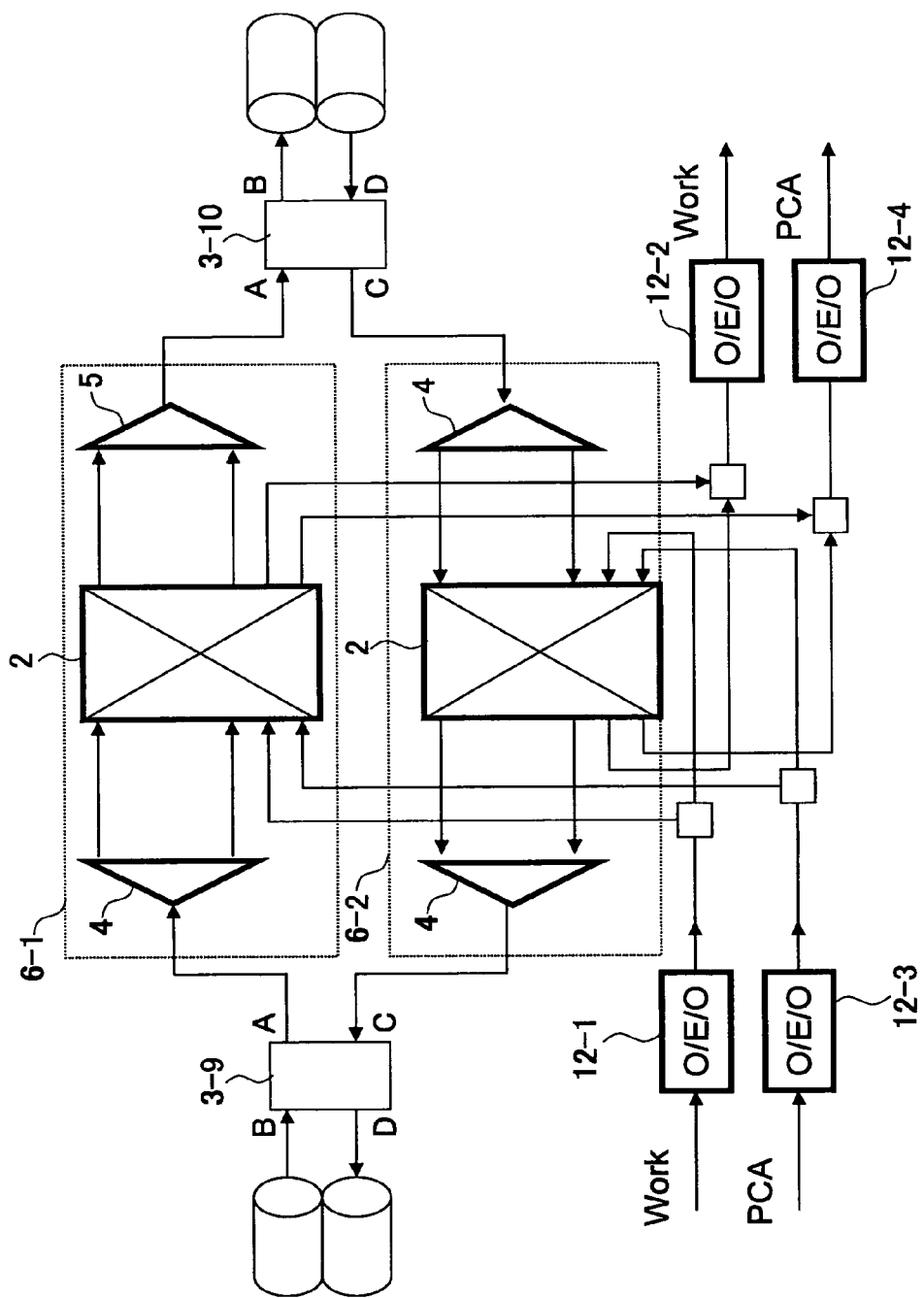
FIG. 14 is a drawing showing an exemplary configuration of a conventional node device.

FIG. 14 is a drawing showing an exemplary configuration of a conventional node device. The conventional node device is described in relation with the node device according to the third embodiment of the present invention shown in FIG. 12. In FIG. 14, the clockwise optical transmission line is connected to port B of the 2×2 switch 3-9 and port A of the 2×2 switch 3-9 is connected to optical add/drop device 6-1.

The 2×2 switches 3-9 and 3-10 are optical matrix switches. In a normal operation, ports A and B are connected, and ports C and D are connected.

In the add/drop device 6-1, the optical demultiplexer 4 demultiplexes an input optical signal into respective wavelengths and supplies the wavelengths to a matrix optical switch 2. The matrix optical switch 2 extracts and drops optical signals having a specific wavelength/PCA signals. The matrix optical switch 2 also guides and adds optical signals having a specific wavelength/PCA signals into the network. The respective optical signals with the specific wavelengths which are output from the matrix optical switch 2 are multiplexed in an optical multiplexer 5 and are transmitted to the clockwise optical transmission line through port A of the 2×2 switch 3-10 to port B of the 2×2 switch 3-10.

The counter clockwise optical transmission line is connected to port D of the 2×2 switch 3-10 and port C of the 2×2 switch 3-10 is connected to optical add/drop apparatus 6-2.

In the add/drop device 6-2, the optical demultiplexer 4 demultiplexes an input optical signal into respective wavelengths and supplies the wavelengths to a matrix optical switch 2. The matrix optical switch 2 extracts and drops optical signals having a specific wavelength/PDA signals. The matrix optical switch 2 also guides and adds optical signals having a specific wavelength/PDA signals into the network. The respective optical signals with the specific wavelengths which are output from the matrix optical switch 2 are multiplexed in an optical multiplexer 5 and are transmitted to the counter clockwise optical transmission line through port C of the 2×2 switch 3-9 to port D of the 2×2 switch 3-9.

Figure 15:
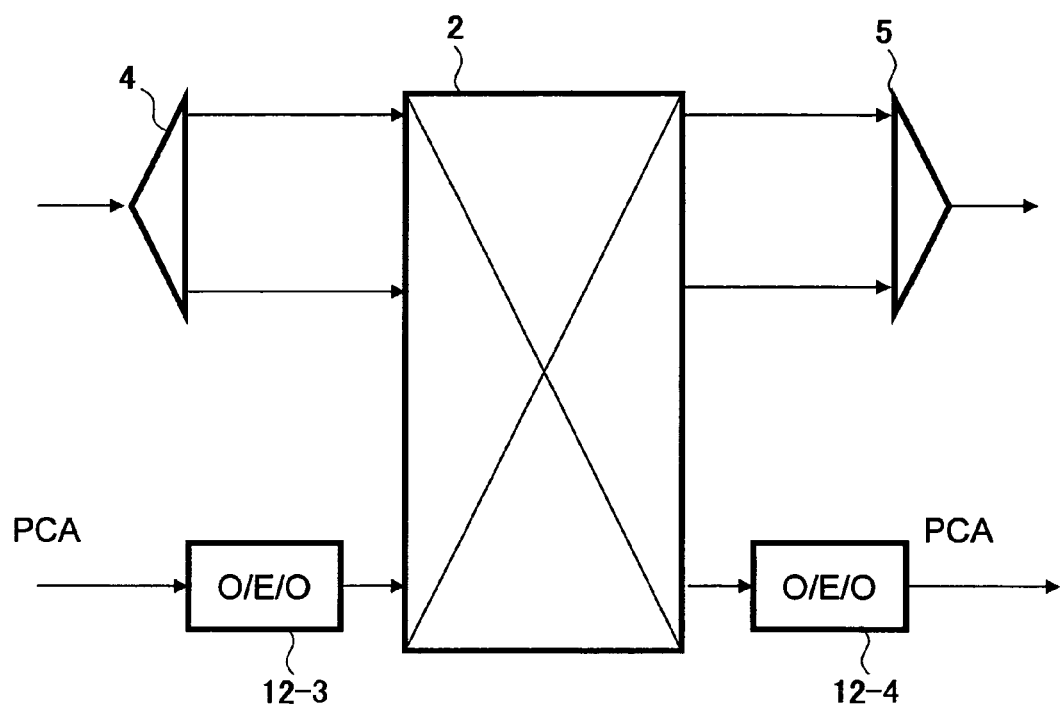
FIG. 15 is a drawing for explaining a portion of the node device shown in FIG. 14 for adding/dropping a PCA signal.

FIG. 15 is a drawing for explaining a portion of the node device shown in FIG. 14 for adding/dropping a PCA signal. In FIG. 15, numerals 12-3 and 12-4 indicate PCA transponders for converting optical signals to electric signals and further converting the electric signals to optical signals. In the line protection applied to the present invention, PCA optical signals are unable to be used when there is a fault. The following embodiments of the present invention serve to improve a transmission property in relation to the inability to use the PCA optical signals and extension of transmission distance during fault.

Figure 16:
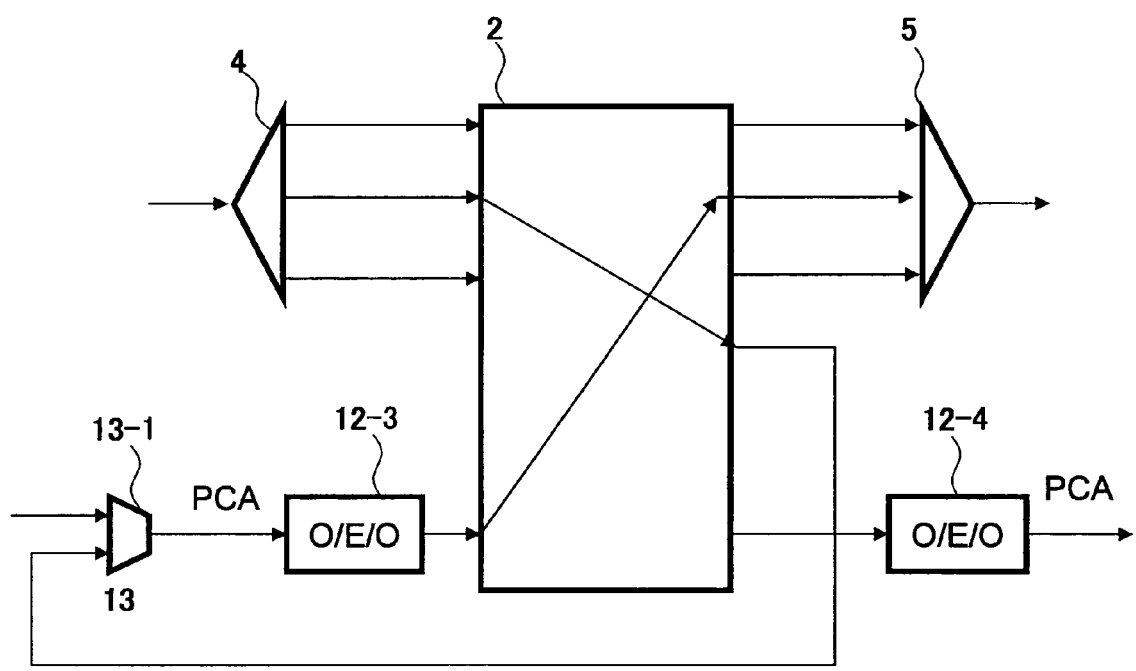
FIG. 16 is a drawing for explaining a portion of a node device according to a fourth embodiment of the present invention for adding/dropping a PCA signal.

FIG. 16 is a drawing for explaining a portion of a node device according to a fourth embodiment of the present invention for adding/dropping a PCA signal. In FIG. 16, an output port of the matrix optical switch 2 is connected to a PCA input transponder 12-3 via an optical selector (or a 2×1 switch) 13-1. In a case of a fault, the matrix optical switch 2 and the optical selector 13 are switched so that a predetermined optical path is routed to pass through the PCA input transponder 12-3. It is to be noted that the switching may be executed, for example, only at the fault end node that returns optical signals. Accordingly, the transmission property, in a case where transmission distance is extended during a fault, can be improved.

Figure 17:
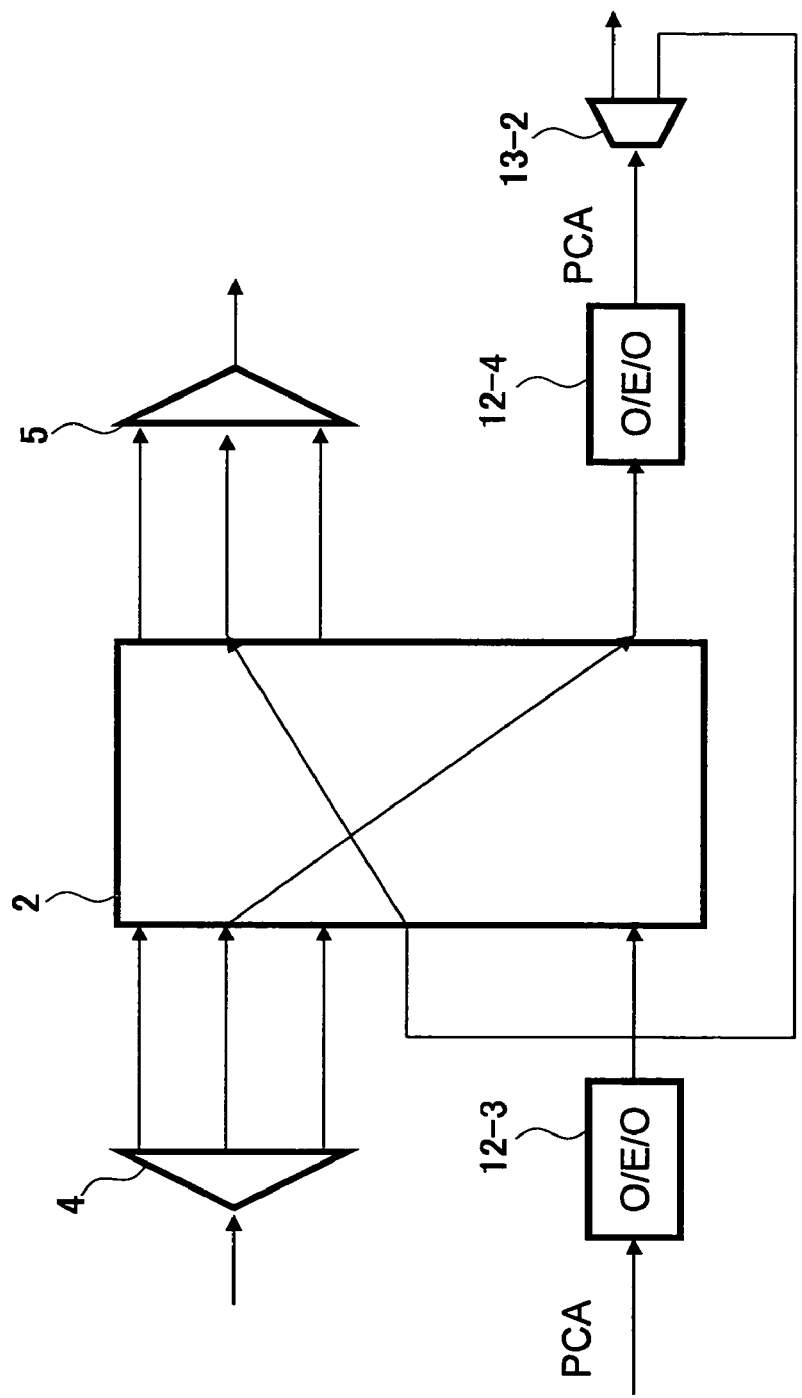
FIG. 17 is a drawing for explaining a portion of a node device according to a fifth embodiment of the present invention for adding/dropping a PCA signal.

FIG. 17 is a drawing for explaining a portion of a node device according to a fifth embodiment of the present invention for adding/dropping a PCA signal. In FIG. 17, an output port of the matrix optical switch 2 is connected to an optical selector (or a 2×1 switch) 13-2 via a PCA output transponder 12-4. In a case of a fault, the matrix optical switch 2 and the optical selector 13-2 are switched so that a predetermined optical path is routed to pass through the PCA output transponder 12-4.

Figure 18:
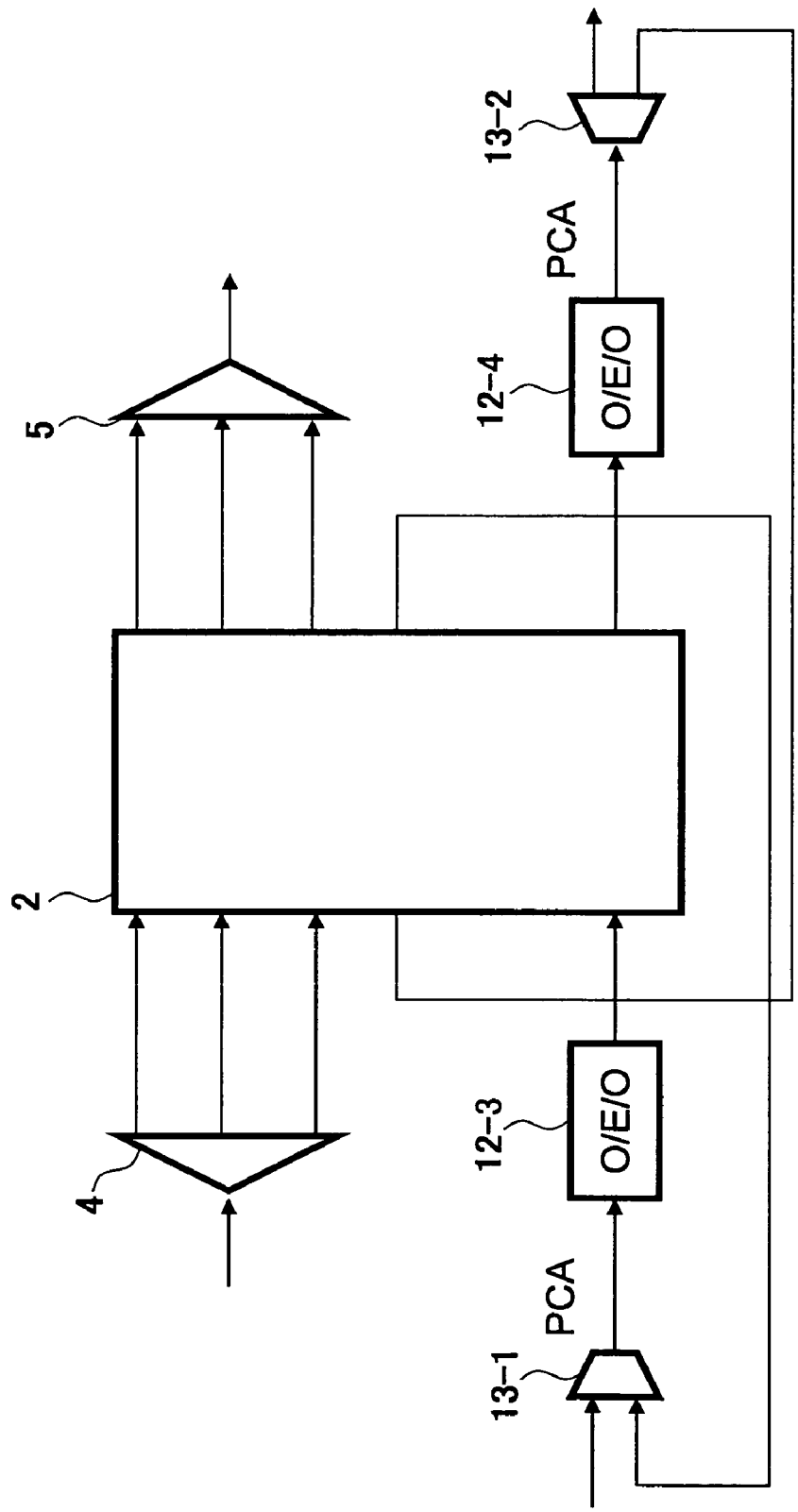
FIG. 18 is a drawing for explaining a portion of a node device according to a sixth embodiment of the present invention for adding/dropping a PCA signal.

FIG. 18 is a drawing for explaining a portion of a node device according to a sixth embodiment of the present invention for adding/dropping a PCA signal. In FIG. 18, an output port of the matrix optical switch 2 is connected to the PCA input transponder 12-3 via the optical selector (or a 2×1 switch) 13-1, and another output port of the matrix optical switch is connected to the optical selector (or a 2×1 switch) 13-2 via the PCA output transponder 12-4.

In a case of a fault, the matrix optical switch 2 and the optical selector 13 are switched so that a predetermined optical path is routed to pass through the PCA input transponder 12-3, and the matrix optical switch 2 and the optical selector 13-2 are switched so that a predetermined optical path is routed to pass through the PCA output transponder 12-4.

According to the node device according to the fourth-sixth embodiments of the present invention, even when a transmission length is extended during a fault, transmission loss can reduced, thereby enabling optical network expansion.

It is to be noted that the optical demultiplexer 10-1 corresponds to a clockwise demultiplexing part in the claims, the optical demultiplexer 10-2 corresponds to a counter clockwise demultiplexing part in the claims, the 2×2 switches 3-2, 3-6 correspond to a second switch part in the claims, the 2×2 switch 3—3 corresponds to a third switch part in the claims, the 2×2 switch 3-4 corresponds to a fourth switch part in the claims, the optical add/drop device 6-1 corresponds to a clockwise add/drop part of the claims, the optical add/drop device 6-2 corresponds to a counter clockwise add/drop part of the claims, the optical multiplexer 11-1 corresponds to a clockwise multiplexing part of the claims, the optical multiplexer 11-2 corresponds to a counter clockwise multiplexing part of the claims, and the transponders 12-3, 12-4 correspond to an optical transmission part of the claims.

Further, the present invention is not limited to these embodiments, but variations and modifications may be made without departing from the scope of the present invention.

What is claimed is:

1. A node device for a bi-directional optical ring network comprising:
   a clockwise demultiplexing part for demultiplexing an input multiplexed wavelength signal into a clockwise active wavelength signal and a clockwise auxiliary wavelength signal;

a counter clockwise demultiplexing part for demultiplexing another input multiplexed wavelength signal into a counter clockwise active wavelength signal and a counter clockwise auxiliary wavelength signal;

a first switch part for transmitting the clockwise active wavelength signal and the counter clockwise auxiliary wavelength signal during a normal operation and returning the counter clockwise auxiliary signal when a fault occurs in an adjacent optical transmission path situated on a left side of the node device;

a fourth switch part for transmitting the counter clockwise active wavelength signal and the clockwise auxiliary wavelength signal during the normal operation and returning the clockwise auxiliary signal when a fault occurs in an adjacent optical transmission path situated on a right side of the node device;

a clockwise add/drop part for adding or dropping a predetermined wavelength signal in the clockwise active wavelength signal transmitted from the first switch part;

a counter clockwise add/drop part for adding or dropping a predetermined wavelength signal in the counter clockwise active wavelength signal transmitted from the fourth switch part;

a second switch part for transmitting the clockwise active wavelength signal output from the clockwise add/drop part and the counter clockwise auxiliary wavelength signal output from the counter clockwise demultiplexing part during the normal operation and returning the clockwise active wavelength signal output from the clockwise add/drop part when a fault occurs in the adjacent optical transmission path situated on the right side of the node device;

a third switch part for transmitting the counter clockwise active wavelength signal output from the counter clockwise add/drop part and the clockwise auxiliary wavelength signal output from the clockwise demultiplexing part during the normal operation and returning the counter clockwise active wavelength signal output from the counter clockwise add/drop part when a fault occurs in the adjacent optical transmission path situated on the left side of the node device;

a clockwise multiplexing part for multiplexing the clockwise active wavelength signal transmitted from the second switch part and the clockwise auxiliary wavelength signal transmitted from the fourth switch part; and a counter clockwise multiplexing part for multiplexing the counter clockwise active wavelength signal transmitted from the third switch part and the counter clockwise auxiliary wavelength signal transmitted from the first switch part.

2. The node device as claimed in claim 1, wherein each of the first-fourth switch parts includes an optical amplifier for amplifying a returned signal.

3. The node device as claimed in claim 1, wherein each of the clockwise add/drop part and the counter clockwise add/drop part also adds/drops a low priority optical signal.

4. A node device for a bi-directional optical ring network comprising:

a first switch part for transmitting a first input multiplexed wavelength signal input from a clockwise optical transmission line and outputting a first output multiplexed wavelength signal to a counter clockwise optical transmission line during a normal operation and returning the first output multiplexed wavelength signal when a fault occurs in an adjacent optical transmission path situated on a left side of the node device;

a second switch part for transmitting a second input multiplexed wavelength signal input from a counter clockwise optical transmission line and outputting a second output multiplexed wavelength signal to a clockwise optical transmission line during the normal operation and returning the second output multiplexed wavelength signal when a fault occurs in an adjacent optical transmission path situated on a right side of the node device;

a clockwise demultiplexing part for demultiplexing the first input multiplexed wavelength signal transmitted from the first switch part into a clockwise active wavelength signal and a clockwise auxiliary wavelength signal;

a counter clockwise demultiplexing part for demultiplexing the second input multiplexed wavelength signal transmitted from the second switch part into a counter clockwise active wavelength signal and a counter clockwise auxiliary wavelength signal;

a clockwise add/drop part for adding or dropping a predetermined wavelength signal in the clockwise active wavelength signal output from the clockwise demultiplexing part;

a counter clockwise add/drop part for adding or dropping a predetermined wavelength signal in the counter clockwise active wavelength signal output from the counter clockwise demultiplexing part;

a clockwise multiplexing part for multiplexing the clockwise active wavelength signal output from the clockwise add/drop part and the clockwise auxiliary wavelength signal output from the clockwise demultiplexing part and transmitting the second output multiplexed wavelength signal to the second switch part; and a counter clockwise multiplexing part for multiplexing the counter clockwise active wavelength signal output from the counter clockwise add/drop part and the counter clockwise auxiliary wavelength signal output from the counter clockwise demultiplexing part and transmitting the first output multiplexed wavelength signal to the first switch part.

5. The node device as claimed in claim 4, wherein each of the first and second switch parts includes an optical amplifier for amplifying a returned signal.

6. The node device as claimed in claim 4, wherein each of the clockwise add/drop part and the counter clockwise add/drop part also adds/drops a low priority optical signal.

7. The node device as claimed in claim 6, further comprising:

an optical transmission part, wherein when a fault occurs in the adjacent optical transmission path situated on the right or left side of the node device, the low priority optical signal dropped by the clockwise add/drop part or the counter clockwise add/drop part is added to the clockwise add/drop part or the counter clockwise add/drop part after being passed through the optical transmission part.

8. The node device as claimed in claim 7, wherein the optical transmission part includes an input optical transmission part for adding the low priority optical signal in the clockwise add/drop part or the counter clockwise add/drop part.

9. The node device as claimed in claim 7, wherein the optical transmission part includes an output optical transmission part for dropping the low priority optical signal in the clockwise add/drop part or the counter clockwise add/drop part.

10. The node device as claimed in claim 7, wherein the optical transmission part includes both an input optical transmission part for adding the low priority optical signal in the clockwise add/drop part or the counter clockwise add/drop part and an output optical transmission part for dropping the low priority optical signal in the clockwise add/drop part or the counter clockwise add/drop part.

* * * * *